(12) United States Patent
Baiz et al.

(10) Patent No.: US 9,701,156 B2
(45) Date of Patent: Jul. 11, 2017

(54) ATTACHMENT STRUCTURE FOR VISIBLE WHEEL FEATURES

(71) Applicant: ESR PERFORMANCE CORP, Miami, FL (US)

(72) Inventors: Enrique J Baiz, Miramar, FL (US); Osvaldo Izquierdo, Homestead, FL (US)

( * ) Notice: Subject to any disclaimer, the term of this patent is extended or adjusted under 35 U.S.C. 154(b) by 0 days.

(21) Appl. No.: 15/134,562

(22) Filed: Apr. 21, 2016

(65) Prior Publication Data

US 2017/0144478 A1    May 25, 2017

Related U.S. Application Data

(63) Continuation-in-part of application No. 29/546,163, filed on Nov. 19, 2015, and a continuation-in-part of application No. 29/546,171, filed on Nov. 19, 2015, and a continuation-in-part of application No. 29/546,174, filed on Nov. 19, 2015, and a continuation-in-part of application No. 29/557,763, filed on Mar. 11, 2016, and a continuation-in-part of application No. 29/558,310, filed on Mar. 16, 2016, and a continuation-in-part of application No. 29/559,656, filed on Mar. 30, 2016, and a continuation-in-part of application No. 29/559,662, filed on Mar. 30, 2016.

(51) Int. Cl.
*B60B 7/00*     (2006.01)
*B60B 7/14*     (2006.01)

(52) U.S. Cl.
CPC .............. *B60B 7/0013* (2013.01); *B60B 7/14* (2013.01)

(58) Field of Classification Search
CPC    B60B 7/0013; B60B 7/14; B60B 7/00; B60B 25/00; B60B 23/00; F16B 37/14
USPC ..... 301/35.621, 35.623, 35.625, 35.631, 9.1, 301/9.2, 35.629, 37.37, 37.42, 108.4, 301/37.372, 37.374, 37.375, 37.376; 411/389, 374, 429
See application file for complete search history.

(56) References Cited

U.S. PATENT DOCUMENTS

| 33,806 | A | * | 11/1861 | Wang et al. | ........ E05D 11/0027 |
|---|---|---|---|---|---|
| | | | | | 292/300 |
| 4,036,530 | A | * | 7/1977 | Reppert | ..................... B60B 3/14 |
| | | | | | 301/35.631 |
| 5,031,965 | A | * | 7/1991 | Buerger | ..................... B60B 7/04 |
| | | | | | 301/108.4 |
| 5,096,263 | A | * | 3/1992 | Wright | ..................... B60B 7/068 |
| | | | | | 301/37.375 |

(Continued)

*Primary Examiner* — S. Joseph Morano
*Assistant Examiner* — Jean Charleston
(74) *Attorney, Agent, or Firm* — TDFoster; Thomas D. Foster; Bruce Hare

(57) ABSTRACT

A wheel attachment structure includes: multiple lug nut and bolts that each include a nut portion that couples to a wheel stud of a vehicle; multiple lug nut spacers, each lug nut spacer having a nut portion that couples to a bolt portion of the lug nut and bolt; a mounting plate with a set of through holes that allow a bolt portion of the lug nut spacer to extend through the mounting plate; and multiple end caps, each end cap having a nut portion that couples to a bolt portion of the lug nut spacer and secures the mounting plate to the lug nut spacers. A combination lug nut and extension bolt includes: a first threaded cavity able to be secured to a wheel stud; and a first protruding threaded bolt.

17 Claims, 11 Drawing Sheets

(56) References Cited

U.S. PATENT DOCUMENTS

| | | | | |
|---|---|---|---|---|
| 5,180,266 | A * | 1/1993 | Nolan | F16B 37/14 |
| | | | | 301/37.374 |
| 5,707,113 | A * | 1/1998 | Russell | F16B 37/14 |
| | | | | 301/108.4 |
| 6,070,947 | A * | 6/2000 | Hoyle, Jr. | B60B 7/14 |
| | | | | 301/108.1 |
| 6,511,132 | B1 * | 1/2003 | Wright | B60B 7/14 |
| | | | | 301/37.371 |
| 6,626,502 | B1 * | 9/2003 | Petrak | B60B 3/147 |
| | | | | 301/35.629 |
| 8,677,623 | B1 * | 3/2014 | Rayburn | B60B 7/068 |
| | | | | 29/894 |
| 2010/0026082 | A1 * | 2/2010 | Liffick | B60B 7/14 |
| | | | | 301/37.376 |
| 2014/0103701 | A1 * | 4/2014 | Chung | B60B 3/008 |
| | | | | 301/108.1 |

\* cited by examiner

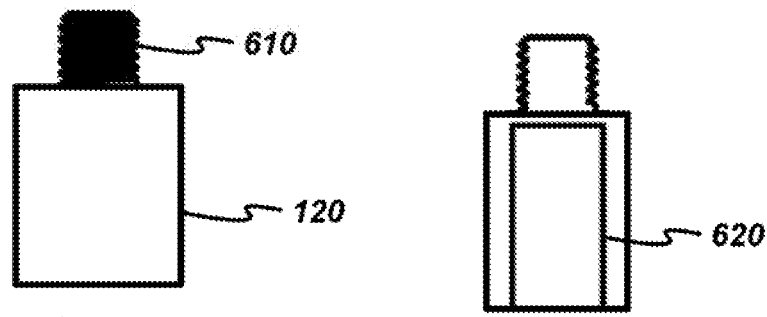
FIG. 6A  FIG. 6B
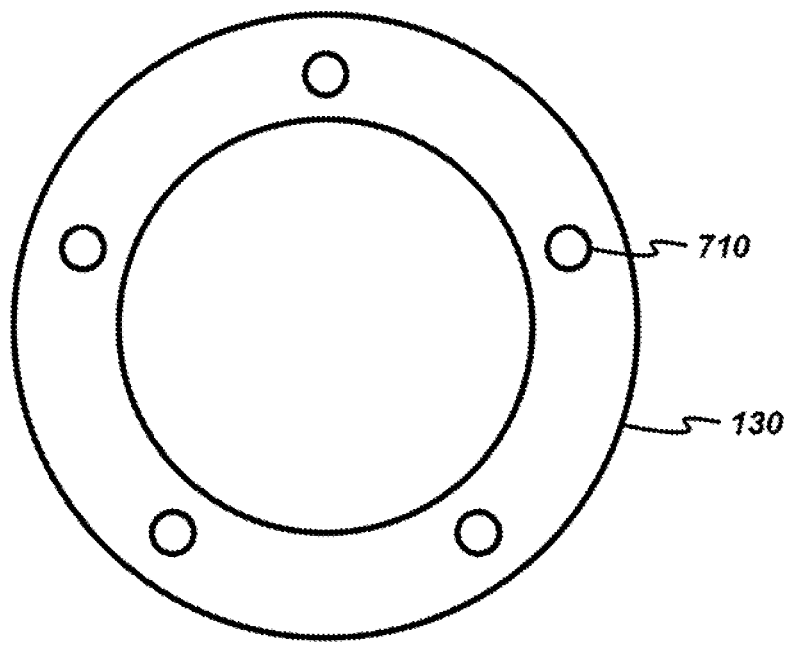
FIG. 7

ATTACHMENT STRUCTURE FOR VISIBLE WHEEL FEATURES

CROSS-REFERENCE TO RELATED APPLICATIONS

This application claims priority to U.S. Design Patent Applications having Ser. No. 29/546,163, filed on Nov. 19, 2015, Ser. No. 29/546,171 filed on Nov. 19, 2015, Ser. No. 29/546,174, filed on Nov. 19, 2015, Ser. No. 29/557,763, filed on Mar. 11, 2016, Ser. No. 29/558,310, filed on Mar. 16, 2016, Ser. No. 29/559,656, filed on Mar. 30, 2016, and Ser. No. 29/559,662, filed on Mar. 30, 2016.

BACKGROUND

Many vehicle owners want to add various distinctive features to their vehicles. Current wheel features are limited to the choice of the wheels themselves, which are not customizable except by installing different wheels.

Such modifications require removal and/or replacement of the wheels, tires, etc. Some owners would prefer to modify the appearance of the wheels without having to remove the wheels.

Therefore there exists a need for an attachment structure for visible wheel features that allows users to customize the wheels in various ways without requiring modification of the wheel or vehicle and that allow appearance changes without removing the wheels.

SUMMARY

Some embodiments provide a structure that couples visible features to a wheel. Such a wheel may be associated with a vehicle such as an automobile, truck, motorcycle, bicycle, trailer, plane, etc. The wheel may be attached to the vehicle using one or more wheel studs that extend out from each hub and may pass through associated through holes in the wheel.

Some embodiments may include a combination lug nut and bolt that may be able to securely couple the wheel to the vehicle using a nut section that may be able to be attached to the wheel studs. The lug nut and bolt may include an extending bolt portion that allows additional structural and/or visible features to be coupled to the lug nut and bolt.

The structure of some embodiments may include a combination nut and bolt extension element. The extension element may include a nut that may be able to be coupled to the combination lug nut and bolt. The extension element may further include an extension bolt that allows additional structural and/or visible features to be coupled to the extension element.

In some embodiments, the structure may include a mounting plate that has a set of through holes that may accept a portion of the extension bolt of either the combination lug nut and bolt or the combination nut and bolt extension element.

Some embodiments may include an end cap element having a nut portion that may be able to be coupled to the extension bolt of the extension element or the extension bolt of the lug nut and bolt. The end cap element may secure the mounting plate to the extension element or lug nut and bolt.

The preceding Summary is intended to serve as a brief introduction to various features of some exemplary embodiments. Other embodiments may be implemented in other specific forms without departing from the scope of the disclosure.

BRIEF DESCRIPTION OF THE SEVERAL VIEWS OF THE DRAWINGS

The exemplary features of the disclosure are set forth in the appended claims. However, for purpose of explanation, several embodiments are illustrated in the following drawings.

FIGS. 6A-6B illustrate front and sectional views of an extension nut and bolt of the wheel attachment structure of FIG. 1;

FIG. 7 illustrates a front view of a mounting plate of the wheel attachment structure of FIG. 1;

DETAILED DESCRIPTION

The following detailed description describes currently contemplated modes of carrying out exemplary embodiments. The description is not to be taken in a limiting sense, but is made merely for the purpose of illustrating the general principles of some embodiments, as the scope of the disclosure is best defined by the appended claims.

Various features are described below that can each be used independently of one another or in combination with other features. Broadly, some embodiments generally provide an attachment structure for visible wheel features.

The attachment structure may couple a wheel to a vehicle and allow visible features to be attached to an exterior or outward-facing side of the wheel. Such a wheel may be associated with a vehicle such as an automobile, truck, motorcycle, bicycle, trailer, plane, etc. The wheel may be attached to the vehicle using one or more wheel studs that extend out from the hubs of the vehicle and pass through associated through holes in the wheel.

A first exemplary embodiment provides a wheel attachment structure including: multiple lug nut and bolts that couple to a wheel stud of a wheel; multiple lug nut spacers, each lug nut spacer having a nut portion that couples to a bolt portion of the lug nut and bolt; a mounting plate with a set of through holes that allow a bolt portion of the lug nut spacer to extend through the mounting plate; and multiple end caps, each end cap comprising a nut portion that couples to a bolt portion of the lug nut spacer.

A second exemplary embodiment a wheel attachment structure including: multiple lug nuts, each lug nut having a protruding bolt; a face plate including a first set of through holes associated with the protruding bolts of the lug nuts; multiple end caps, each end cap having a threaded cavity able to accept at least a portion of the protruding bolt of the lug nut such that the face plate is securely coupled to the lug nuts.

A third exemplary embodiment provides a combination lug nut and extension bolt including: a first threaded cavity able to be secured to a wheel stud; and a first protruding threaded bolt.

Figure 1:
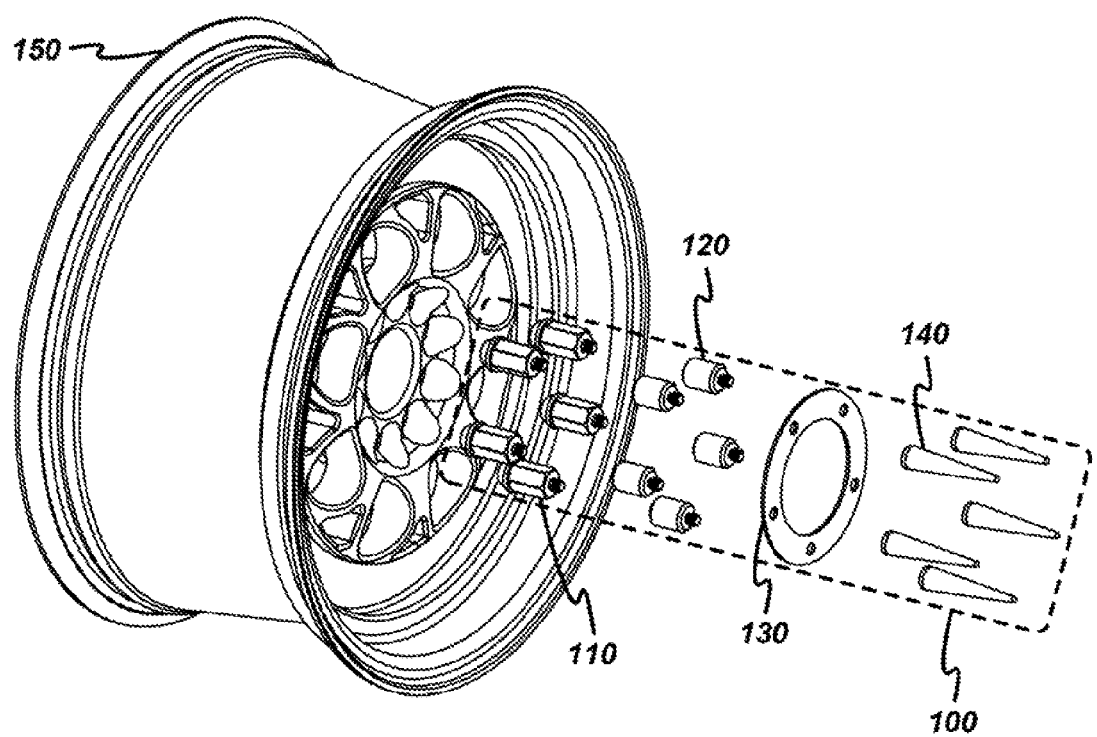
FIG. 1 illustrates an exploded perspective view of a wheel attachment structure according to an exemplary embodiment.

FIG. 1 illustrates an exploded perspective view of a wheel attachment structure 100 according to an exemplary embodiment. As shown, the structure may include a set of combination lug nut and bolts 110, combination nut and bolt extension elements 120, a mounting plate 130, and end caps 140. The various elements will be described in more detail in reference to FIGS. 2-8C below.

An example wheel 150 is included to illustrate the use of the structure 100. One of ordinary skill in the art will recognize that various other wheels may be used without departing from the scope of the disclosure.

The structure 100 may secure the wheel 150 to a vehicle (e.g., by attaching to a set of wheel studs extending out from each hub of the vehicle). Different embodiments may be sized differently and/or include different arrangements of components, based on various relevant factors such as vehicle type, make, model, wheel specifications, etc.

Figure 2:
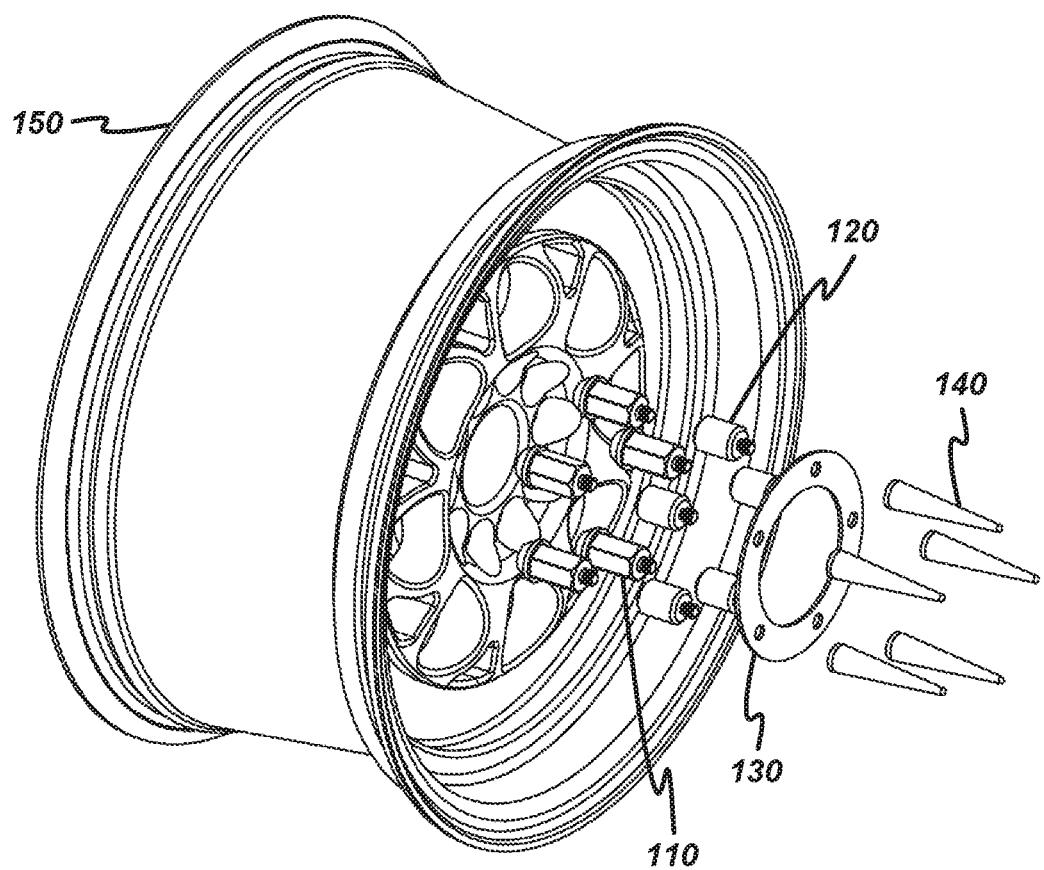
FIG. 2 illustrates another exploded perspective view of the wheel attachment structure of FIG. 1.
Figure 3:
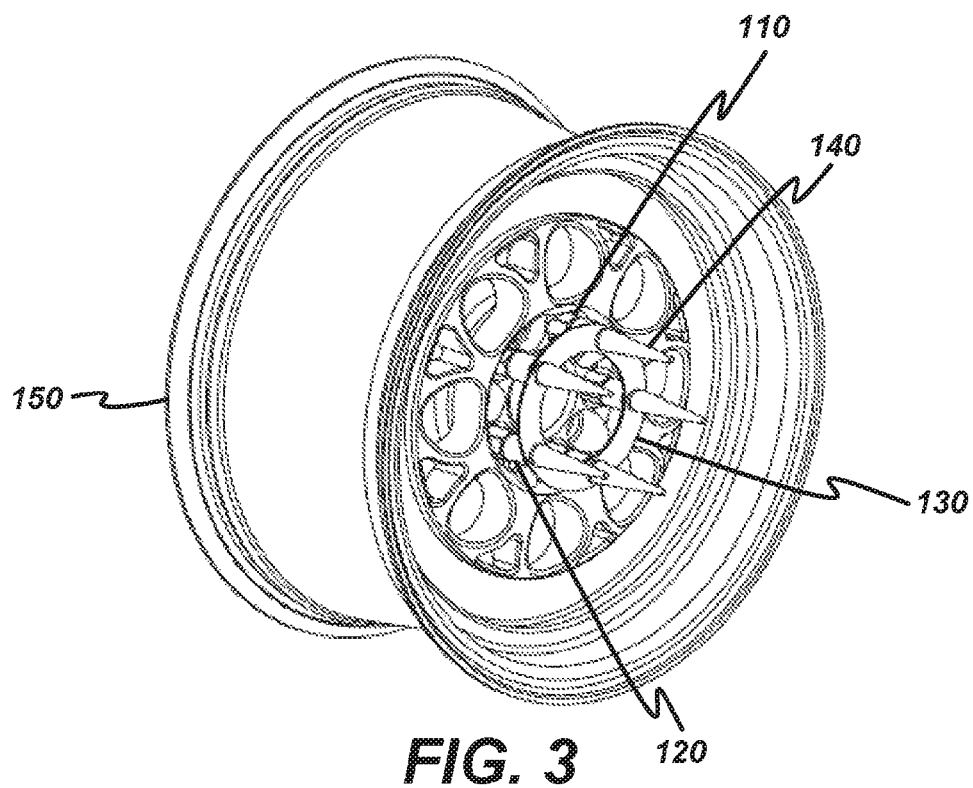
FIG. 3 illustrates a perspective view of the wheel attachment structure of FIG. 1 as coupled to an example wheel.
Figure 4:
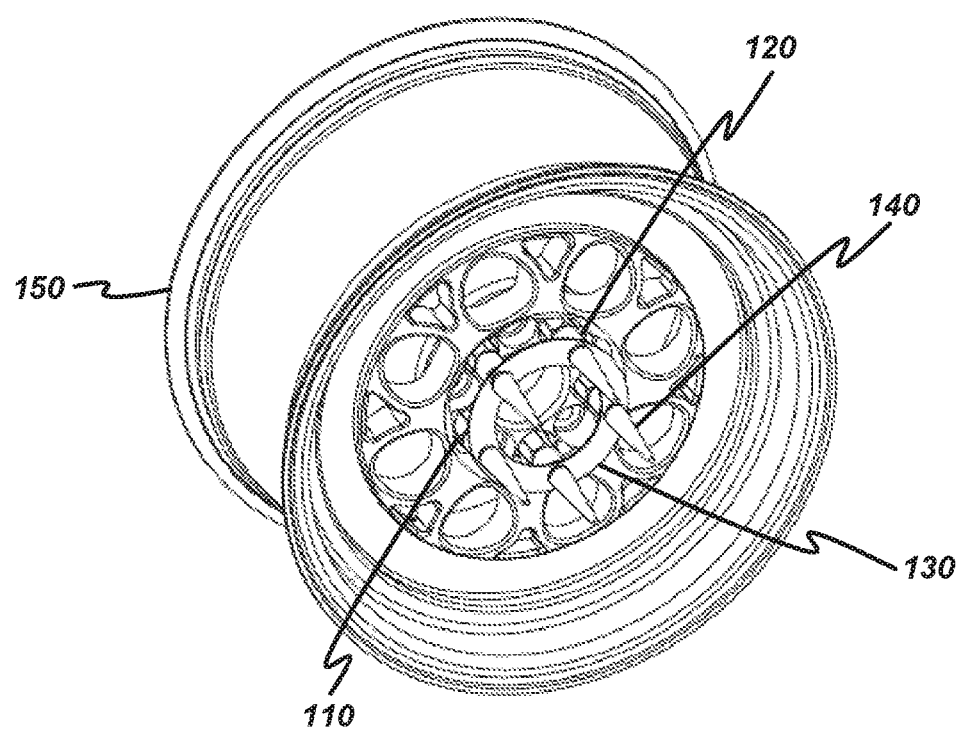
FIG. 4 illustrates another perspective view of the wheel attachment structure of FIG. 1 as coupled to the example wheel.
Figure 5A:
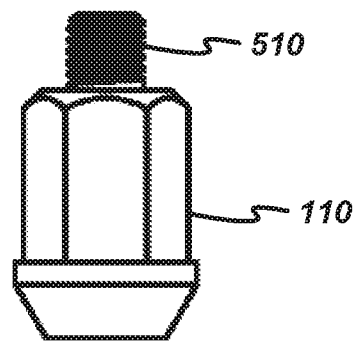
FIGS. 5A-5H illustrate front, sectional, top, bottom, and various perspective views of a lug nut and bolt of the wheel attachment structure of FIG. 1.
Figure 5B:
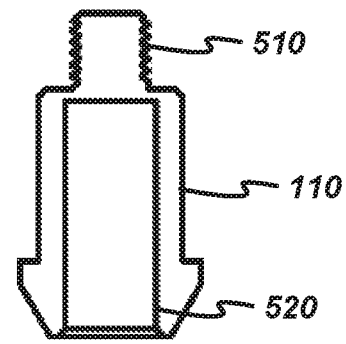
Figure 5C:
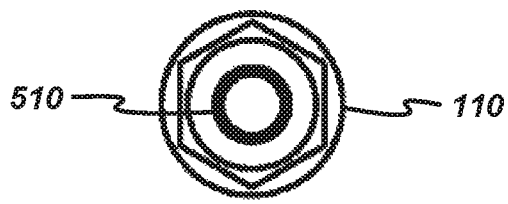
Figure 5D:
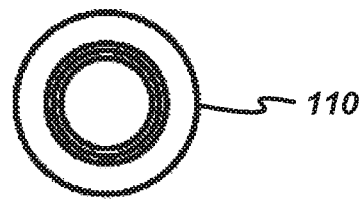
Figure 5E:
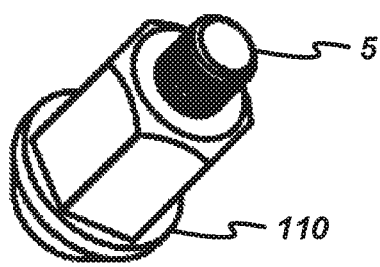
Figure 5F:
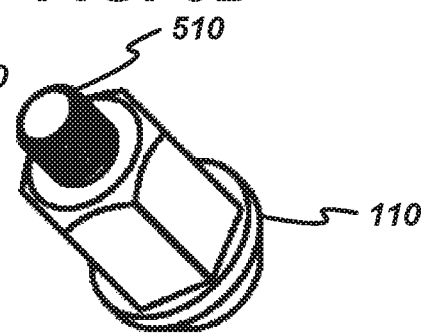
Figure 5G:
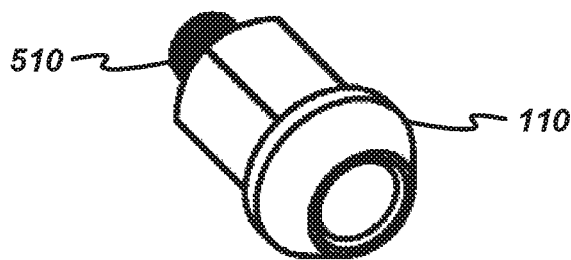
Figure 5H:
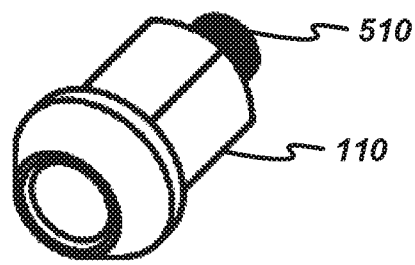

FIG. 2 illustrates another exploded perspective view of the wheel attachment structure 100. FIG. 3 illustrates a perspective view of the wheel attachment structure 100 as coupled to an example wheel. FIG. 4 illustrates another perspective view of the wheel attachment structure 100 as coupled to the example wheel.

FIGS. 5A-5H illustrate front, sectional, top, bottom, and various perspective views of a lug nut and bolt 110 of the wheel attachment structure 100. As shown, the combination lug nut and bolt 110 may include a protruding threaded cylinder (or "bolt") 510 and a threaded cavity (or "nut") 520. The bolt 510 and threaded cavity may extend along a same axis, as shown.

The combination lug nut and bolt 110 may be able to securely couple the wheel to a vehicle using a nut section 520 that is able to be attached to the vehicle bolt in place of a standard lug nut. The extending bolt portion 510 may allow additional structural and/or visible features to be coupled to the lug nut and bolt 110.

The combination lug nut and bolt 110 may have various visible features such as different finishes, colors, textures, graphics, etc. In addition, different embodiments of the lug nut 110 may have different shapes, relative sizes, and/or other variations in structure and/or appearance.

FIGS. 6A-6B illustrate front and sectional views of an extension nut and bolt 120 (or "lug nut spacer") of the wheel attachment structure 100. As shown, the extension nut and bolt may include a protruding bolt 610 and a threaded nut 620.

The threaded cavity 620 is able to be coupled to the combination lug nut and bolt. The extension element 120 may further include an extension bolt 610 that allows additional structural and/or visible features to be coupled to the extension element. The bolt 610 and cavity 620 may extend along a same axis as shown.

The extension nut and bolt 120 may have various finishes, exterior colors, textures, graphics, and/or other visible features. In addition, different embodiments of the lug nut spacer 120 may have different shapes, relative sizes, and/or other variations in structure and/or appearance.

FIG. 7 illustrates a front view of a mounting plate 130 of the wheel attachment structure 100. As shown, the mounting plate 130 may include a number of through-holes 710. The set of through holes 710 may be able to accept a portion of the extension bolt of either the combination lug nut and bolt 110 or the combination nut and bolt extension element 120. The mounting plate 130 may provide rigidity to the structure 100 such that the extending elements 120 and end caps 140 are maintained in a fixed position relative to the wheel center.

In this example, the mounting plate 130 has a round ring shape. Different embodiments may include various differently-shaped plates. For instance, the plate may be various polygonal shapes such as triangles, rectangles, hexagons, etc. As another example, the plate may be various elliptical shapes such as circles, ovals, etc. In addition, some embodiments may include solid plates, while others may have plates with one or more voids in the center as in this example.

In some embodiments, the plates may include various irregular patterns or shapes. For instance, some embodiments may include a ring with features that extend outward from the outer radius of the ring (e.g., flame-shaped features, a saw tooth pattern, etc.). In addition, some embodiments may include other variations in display elements such as finishes, textures, colors, graphics, etc.

Figure 8A:
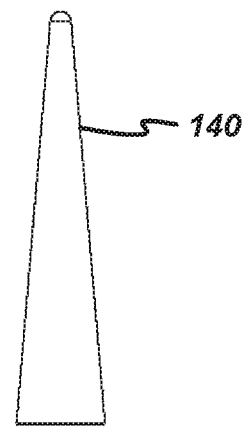
FIGS. 8A-8C illustrate front, sectional, and perspective views of an end cap nut of the wheel attachment structure of FIG. 1.
Figure 8B:
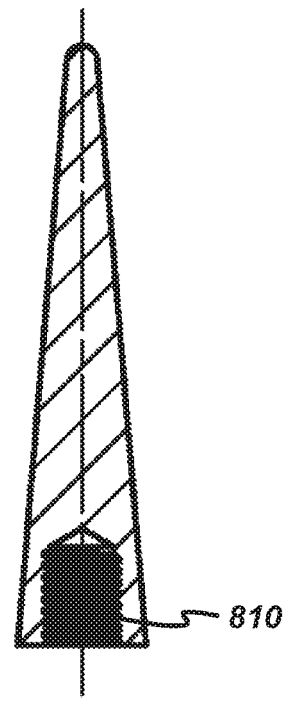
Figure 8C:
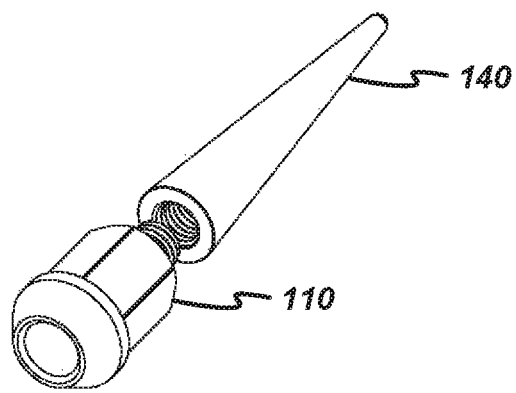

FIGS. 8A-8C illustrate front, sectional, and perspective views of an end cap nut 140 of the wheel attachment structure 100. As shown the end cap nut 140 my include a threaded cavity 810.

The nut portion 810 may be able to be coupled to the extension bolt of the extension element 120 or the extension bolt of the lug nut and bolt 110. The end cap element 140 may be sized such that the bas of the end cap is larger than the size of the through holes 710 in order to allow the mounting plate 130 to be secured between the end cap 140 and the extension element 120 or lug nut and bolt 110.

In this example, the end cap 140 is conical, but different embodiments may include different end cap shapes, sizes, etc. For instance, the end cap may be various shapes, such as cylindrical, polygonal, spherical, etc. As another example, the end cap may be shaped like various objects (e.g., bullets, golf balls, etc.). In addition, the end cap may include various other ornamental elements along portions of the visible exterior (e.g., surface variations, textures, graphics, colors, etc.).

During use of the structure 100, a user may initially replace vehicle lug nuts with the lug nut and bolt 110. The lug nut and bolt may be selected based on various relevant factors (vehicle type, appearance, etc.).

The user may then further couple structural elements such as the spacer 120, mounting plate (or "face" plate) 130, and end caps 140 to the lug nut and bolt 110. Such additional features may be able to be exchange for various other features without requiring removal of the lug nut and bolt 110. In this way a user may customize various sub-elements, such as the spacer 120 without having to modify or replace any other sub-elements.

Figure 9:
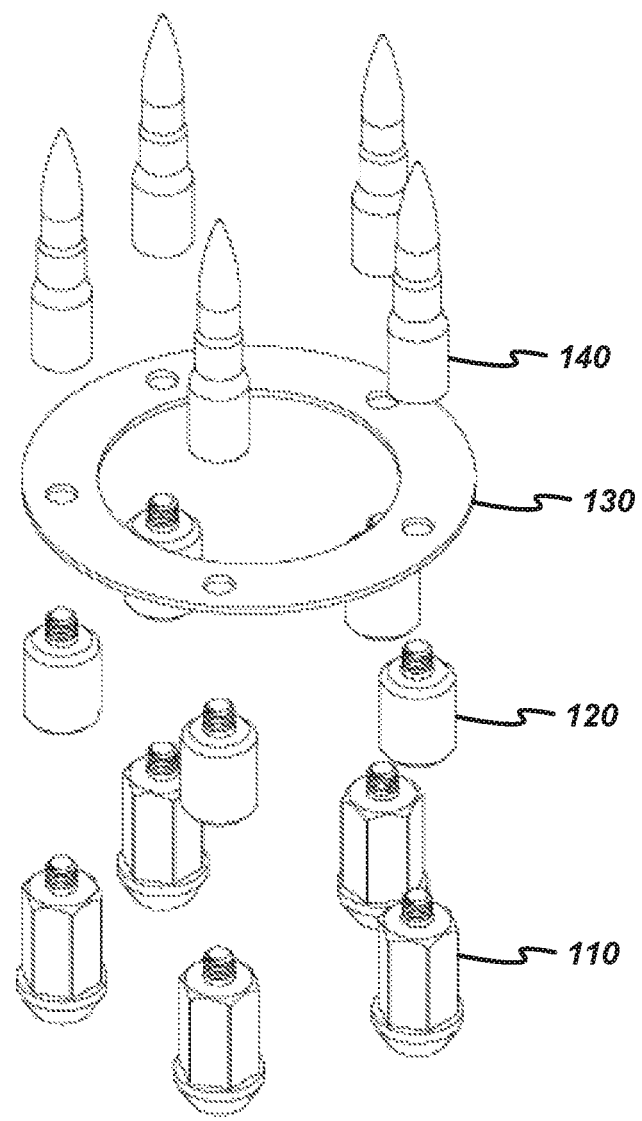
FIG. 9 illustrates an exploded perspective view of an alternative exemplary wheel attachment structure.

FIG. 9 illustrates an exploded perspective view of an alternative exemplary wheel attachment structure 100. In this example, the end caps 140 are bullet-shaped and able to be used with the other components of the attachment structure 100 as described above.

Figure 10:
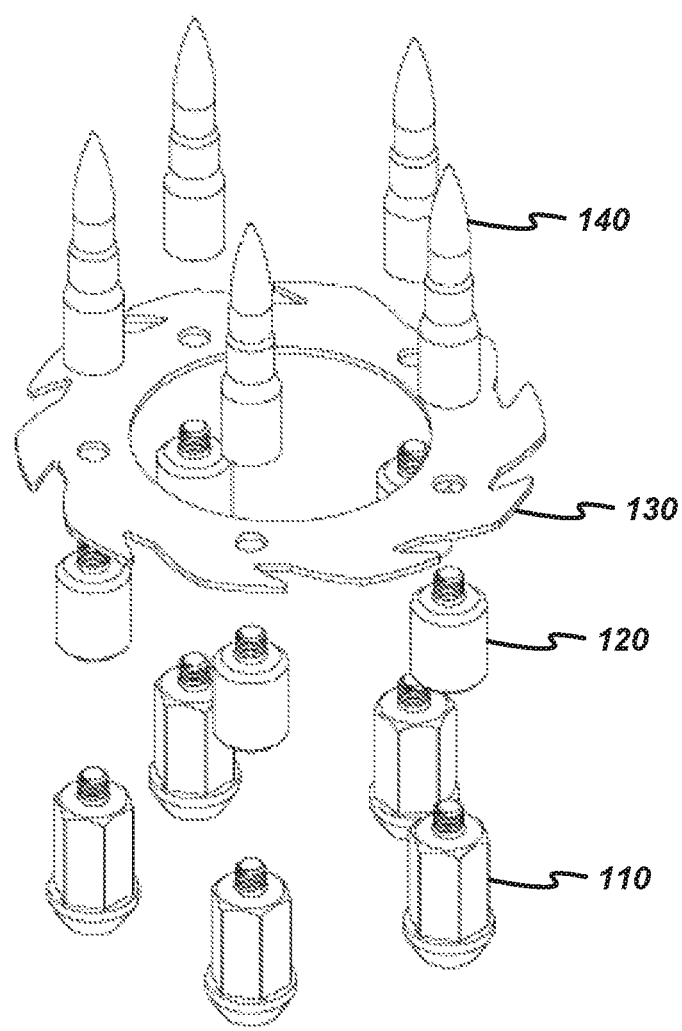
FIG. 10 illustrates an exploded perspective view of another alternative exemplary wheel attachment structure.

FIG. 10 illustrates an exploded perspective view of another alternative exemplary wheel attachment structure 100. In this example, the face plate 130 has a saw tooth pattern along the external radius as shown. The alternative face plate 130 may be used with the other components of the attachment structure 100 as described above.

Figure 11:
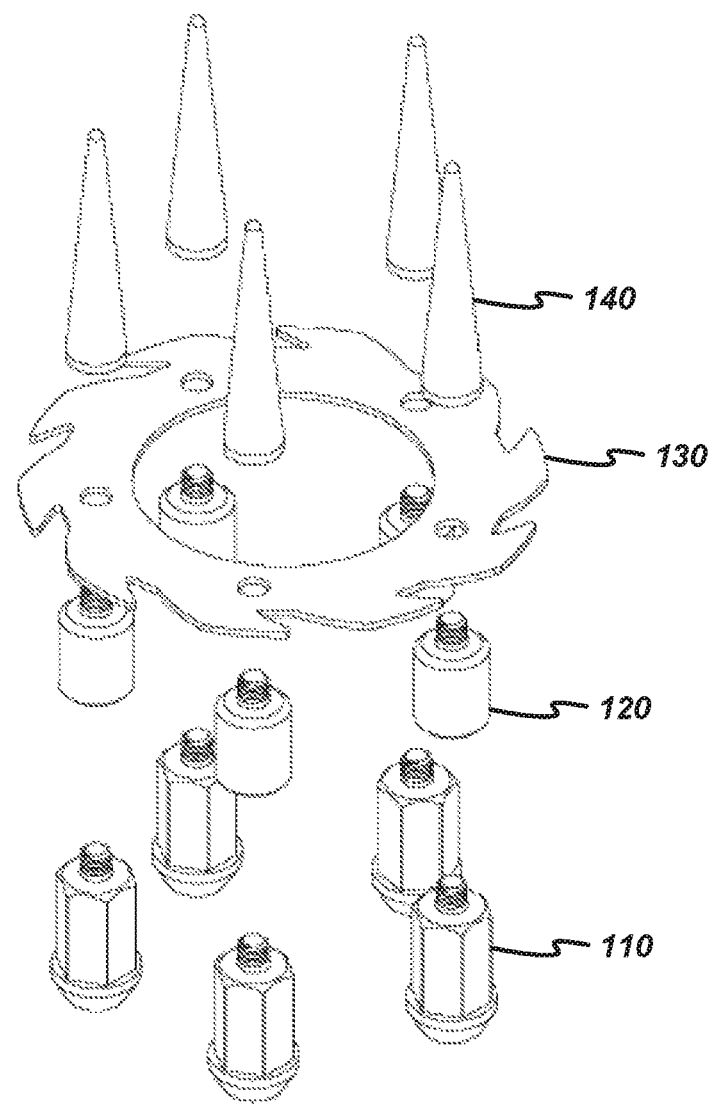
FIG. 11 illustrates an exploded perspective view of another alternative exemplary wheel attachment structure.

FIG. 11 illustrates an exploded perspective view of another alternative exemplary wheel attachment structure 100. This example combines the face plate 130 from the example of FIG. 10 with the end caps from the example of FIG. 1.

Figures 12A, 12B:
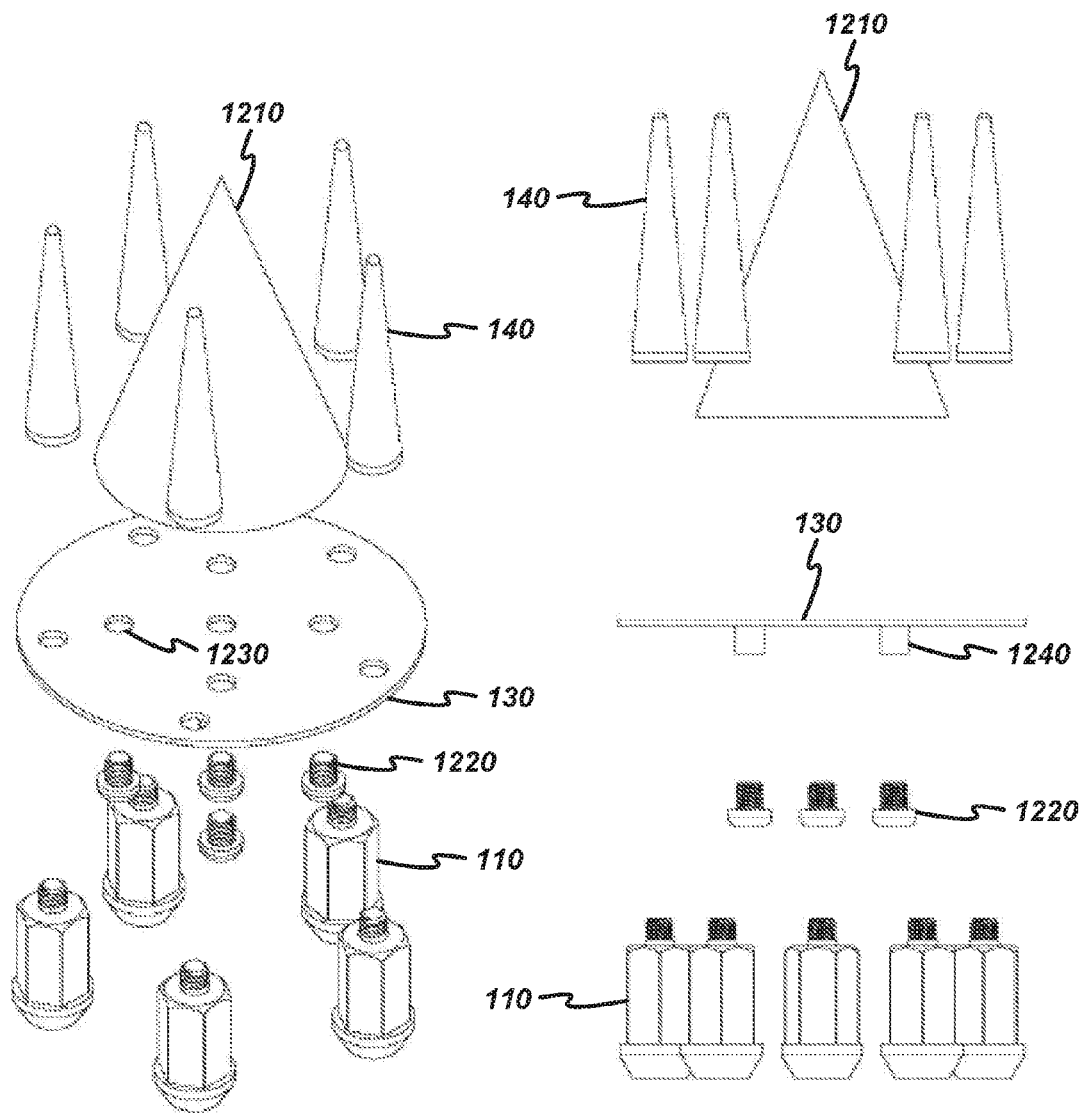
FIGS. 12A-12B illustrate exploded perspective and side views of another alternative exemplary wheel attachment structure.

FIGS. 12A-12B illustrate exploded perspective and side views of another alternative exemplary wheel attachment structure 100. This structure includes a center cap feature 1210 that is able to be securely coupled to the face plate 130 using bolts 1220 and through-holes 1230. The center cap 1210 may have threaded cavities that correspond to the locations of the through holes 1230 and are able to accept at least a portion of bolts 1220. In addition, the faceplate may include additional through holes that correspond to posts or pins that extend out from the bottom of the center cap 1210 in order to provide an alignment guide during installation. The example of FIGS. 12A-12B does not include extension elements 120.

Some embodiments may include offsets 1240 (which may be attached to the faceplate or may be removable items such as washers) that are able to accept at least a portion of bolts 1220. In some embodiments, the offsets 1240 may include threaded internal cavities.

Figure 13:
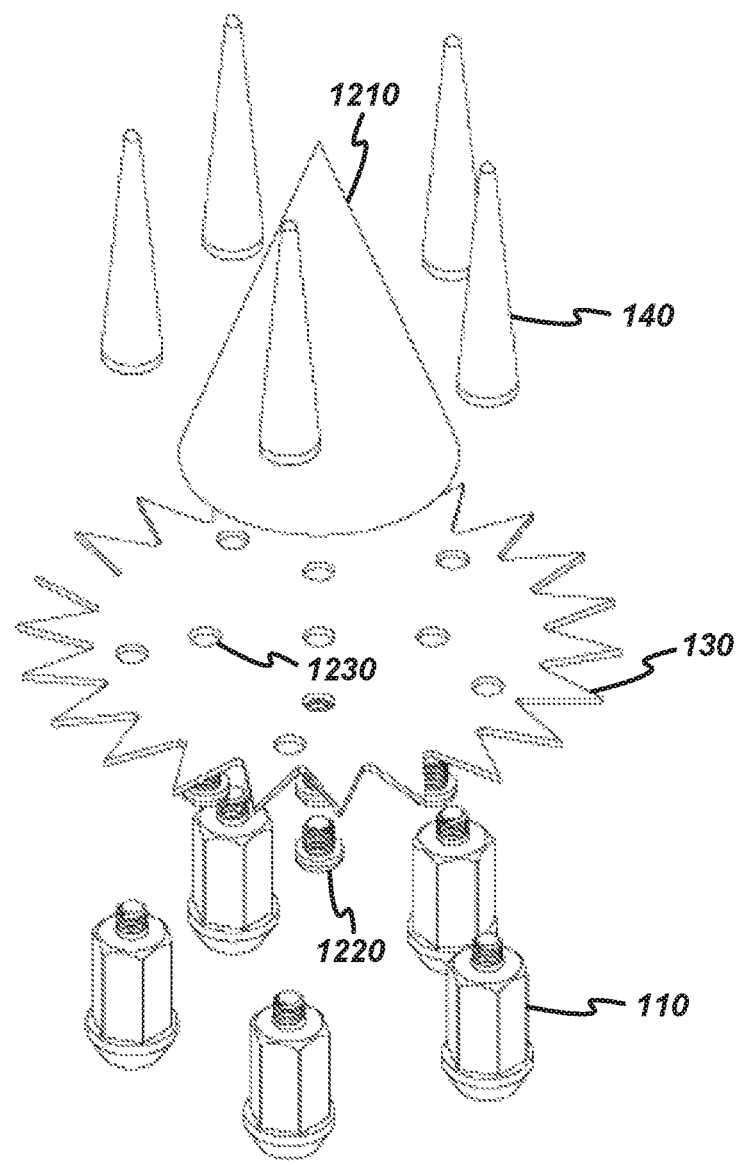
FIG. 13 illustrates an exploded perspective view of another alternative exemplary wheel attachment structure.

FIG. 13 illustrates an exploded perspective view of another alternative exemplary wheel attachment structure 100. In this example, the face plate 130 includes through holes 1230 for a center cap 1210 and has a jagged edge pattern on the outer radius as shown.

As will be understood from the examples above, any detail or pattern on the outer radius (or perimeter) of the face plate 130 may extend from a first radius to a second radius, where the second radius is larger than the first radius. The first and second radii may be defined relative to a center point of the face plate. The first radius may be large enough to provide structure support for the through holes associated with the lug nuts (or other features such as the center cap). The second radius may extend out various amounts depending on the pattern or design and/or other relevant factors (e.g., diameter of the wheel).

One of ordinary skill in the art will recognize that the various features described above may be combined in various appropriate ways. Thus, a structure may include various alternative elements that are able to be coupled to various other alternative elements while providing a secure wheel attachment structure that is able to couple a wheel to a vehicle. This may allow an owner to customize various aspects of the structure while retaining other aspects to reduce modification expense and effort.

In addition, some embodiments may include like-sized cavities and bolts such that various components may be included, omitted, rearranged, etc. For instance, the extension elements 120 may be omitted to achieve a structure that has a lower profile relative to the wheel exterior. As another example, some embodiments may include multiple extension elements coupled linearly such that the structure extends further out relative to the wheel exterior. As still another example, some embodiments may omit the mounting plate 130 and include only lug nuts 110 and end caps 140 (or, optionally include one or more extension elements 130 in each tower). As still another example, extension elements 120 may be placed outside the mounting plate 130.

Furthermore, various components may be combined or divided in appropriate ways. For instance, the lug nut 110 and extension element 120 may be provided by a single component that includes variations in the exterior surface (e.g., a portion may be smooth round while a portion is hexagonal). Similarly, the extension elements 120 may each be divided into multiple sub-elements that may have different shapes, colors, finishes, textures, etc.

The foregoing relates to illustrative details of exemplary embodiments and modifications may be made without departing from the scope of the disclosure as defined by the following claims.

We claim:

1. A wheel attachment structure comprising:
   a plurality of lug nut and bolts that each include a nut portion that couples to a wheel stud of a vehicle;
   a plurality of lug nut spacers, each lug nut spacer having a nut portion that couples to a bolt portion of the lug nut and bolt;
   a mounting plate with a set of through holes that allow a bolt portion of the lug nut spacer to extend through the mounting plate; and
   a plurality of end caps, each end cap comprising a nut portion that couples to a bolt portion of the lug nut spacer and secures the mounting plate to the lug nut spacers.

2. The wheel attachment structure of claim 1, wherein the nut portion of the lug nut and bolt comprises a threaded cylindrical cavity and the bolt portion of the lug nut and bolt comprises a threaded cylindrical protrusion.

3. The wheel attachment structure of claim 1, wherein the nut portion of the lug nut spacer comprises a threaded cylindrical cavity and the bolt portion of the lug nut space comprises a threaded cylindrical protrusion.

4. The wheel attachment structure of claim 1, wherein the nut portion of the end cap comprises a threaded cylindrical cavity.

5. The wheel attachment structure of claim 1, wherein the end cap is one of conical, cylindrical, bullet-shaped, and polygonal.

6. The wheel attachment structure of claim 1, wherein the lug nut and bolt is hexagonal.

7. The wheel attachment structure of claim 1, wherein the lug nut spacer is one of cylindrical and polygonal.

8. A wheel attachment structure comprising:
   a plurality of lug nuts, each lug nut comprising a protruding bolt;
   a face plate comprising a first set of through holes associated with the protruding bolts of the plurality of lug nuts and a second set of through holes;
   a center cap coupled to the face plate by a set of bolts that pass through the second set of through holes and align with a plurality of threaded cavities in the center cap; and
   a plurality of end caps, each end cap comprising a threaded cavity able to accept at least a portion of the protruding bolt of the lug nut such that the face plate is securely coupled to the plurality of lug nuts.

9. The wheel attachment structure of claim 8, wherein the face plate further comprises at least one alignment through hole associate with a post of the center cap.

10. The wheel attachment structure of claim 8, wherein the center cap is conical.

11. The wheel attachment structure of claim 8, wherein the face plate comprises a pattern along an exterior perimeter, the pattern extending from a first radius to a second radius about a center point of the face plate.

12. The wheel attachment structure of claim 11, wherein the pattern is one of a saw tooth pattern, a jagged edge pattern, and a smooth round pattern.

13. A combination lug nut and extension bolt comprising:
   a first threaded cavity able to be secured to a wheel stud;
   a first protruding threaded bolt; and
   an extension element having a second threaded cavity able to accept at least a portion of the first protruding threaded bolt and a second protruding threaded bolt.

14. The combination lug nut and extension bolt of claim 13, wherein the combination lug nut and extension bolt comprises a hexagonal outer surface.

15. The combination lug nut and extension bolt of claim 13, wherein the combination lug nut and extension bolt comprises a round outer surface.

16. The combination lug nut and extension bolt of claim 13 further comprising an end cap having a third threaded cavity able to be secured to the second protruding threaded bolt.

17. The combination lug nut and extension bolt of claim 13 further comprising an end cap having a second threaded cavity able to be secured to the first protruding threaded bolt.

\* \* \* \* \*